United States Patent
Mochizuki et al.

(10) Patent No.: US 6,932,741 B2
(45) Date of Patent: Aug. 23, 2005

(54) ENGINE CONTROL DEVICE (75) Inventors: Nobuaki Mochizuki, Fuji (JP);
Hirofumi Michioka, Fuji (JP);
Morimasa Yamawaki, Fuji (JP); Koji Koizumi, Fuji (JP); Jun Takeuchi, Kawasaki (JP); Hiroyasu Fujioka, Isehara (JP)

(73) Assignee: Jatco Ltd., Fuji (JP)

( * ) Notice: Subject to any disclaimer, the term of this patent is extended or adjusted under 35 U.S.C. 154(b) by 67 days.

(21) Appl. No.: 10/751,110

(22) Filed: Jan. 5, 2004

(65) Prior Publication Data

US 2004/0192501 A1 Sep. 30, 2004

(30) Foreign Application Priority Data

Jan. 7, 2003 (JP) ........................................ 2003-001376

(51) Int. Cl.[7] ............................................. B60K 41/04
(52) U.S. Cl. ...................................... 477/110; 477/111
(58) Field of Search .................................. 477/107, 110, 477/111, 902

(56) References Cited

U.S. PATENT DOCUMENTS

| | | | | |
|---|---|---|---|---|
| 4,730,708 A | * | 3/1988 | Hamano et al. | 477/114 |
| 4,898,138 A | * | 2/1990 | Nishimura et al. | 123/399 |
| 5,403,246 A | * | 4/1995 | Umemoto | 477/101 |
| 5,743,826 A | * | 4/1998 | Usuki et al. | 477/98 |
| 5,795,262 A | * | 8/1998 | Robinson | 477/92 |
| 6,634,984 B1 | * | 10/2003 | Doering et al. | 477/107 |
| 6,881,170 B2 | * | 4/2005 | Onoyama et al. | 477/39 |

FOREIGN PATENT DOCUMENTS

JP          61-105228 A     5/1986

* cited by examiner

*Primary Examiner*—Tisha Lewis
(74) *Attorney, Agent, or Firm*—Foley & Lardner LLP (57) ABSTRACT

An engine control device (20) for a vehicle has a torque control mechanism (17) for regulating the engine output torque. The torque control mechanism (17) includes at least one of a throttle valve (11) and a fuel injector (12). The engine control device further has a sensor (10) for detecting the shift lever position and a controller. The controller is configured to detect a shift in the shift lever position from the stationary range position (N or P range) to the running range position (D or R range) based on the shift lever position; and transmit a command signal to the torque control mechanism (17) when a first predetermined period elapses after the detection of the shift in the shift lever position, the command signal increasing the engine output torque by a predetermined correction gain $\Delta Te$ from a first output torque $Te0$ at the detection of the shift lever position to a second output torque $Te1$.

9 Claims, 6 Drawing Sheets

ENGINE CONTROL DEVICE

FIELD OF THE INVENTION

This invention relates to an engine control device. In particular, it relates to control executed by an engine control device when a driver shifts a shift lever position from a stationary range position (P range position or N range position) to a running range position (D range position or R range position).

BACKGROUND OF THE INVENTION

A prior art technique disclosed in Tokkai Sho61-105228 published by the Japan Patent Office in 1986 reduces engine torque when the shift lever position is shifted from a stationary range position to a running range position in a stationary state of the vehicle. The prior art technique delays the ignition timing of the engine in response to the engagement of a forward/reverse clutch used for starting the vehicle. Consequently torque inputted to the clutch from the engine is reduced in the time period from the commencement of engagement of the forward/reverse clutch to completion of engagement. Thus, output torque from an automatic/transmission is reduced in this time period. In this manner, it is possible to suppress differences in output torque of an automatic/transmission (torque differentials) before and after the shift of the automatic transmission from a stationary range to a running range. Furthermore it is possible to suppress torque shock associated with clutch engagement.

SUMMARY OF THE INVENTION

However the prior art technique for suppressing torque differentials only takes account of the fact that before shifting to a running range the output torque of the automatic transmission approaches the output torque after the shift. It does not take account of an overshoot or under shoot of the output torque of the automatic transmission.

It is therefore an object of this invention to further suppress torque shock associated with shifting from a stationary range to a running range in an automatic transmission.

In order to achieve the above object, this invention provides an engine control device for a vehicle, the vehicle having an engine, an automatic transmission receiving an output torque of the engine, a drive shaft for transmitting an output torque from the automatic transmission to the vehicle wheels and a shift lever for selecting the operating range of the automatic transmission; wherein the operating range of the automatic transmission includes a stationary range in which the engine output torque is not transmitted to a side of the drive shaft and a running range in which the engine output torque is transmitted to the side of the drive shaft, and a shift lever position includes a stationary range position corresponding to the stationary range of the automatic transmission and a running range position corresponding to the running range of the automatic transmission. The engine control device comprises a torque control mechanism for regulating the engine output torque, the torque control mechanism including at least one of a fuel injector for injecting fuel and a throttle valve for regulating an intake air amount to the engine; a sensor for detecting the shift lever position; and a controller. The controller is programmed to detect a shift in the shift lever position from the stationary range position to the running range position based on the shift lever position; and transmit a command signal to the torque control mechanism when a first predetermined period elapses after the detection of the shift in the shift lever position, the command signal increasing the engine output torque by a predetermined correction gain from a first output torque at the detection of the shift lever position to a second output torque.

Further, this invention provides an engine control method for the vehicle, the engine control method comprising the steps of detecting the shift lever position; detecting a shift in the shift lever position from the stationary range position to the running range position based on the shift lever position; and transmitting a command signal to the torque control mechanism when a first predetermined period elapses after the detection of the shift in the shift lever position, the command signal increasing the engine output torque by a predetermined correction gain from a first output torque at the detection of the shift lever position to a second output torque. The torque control mechanism includes at least one of a fuel injector for injecting fuel and a throttle valve for regulating an intake air amount to the engine.

The details as well as other features and advantages of this invention are set forth in the remainder of the specification and are shown in the accompanying drawings.

BRIEF DESCRIPTION OF THE DRAWINGS

FIG. 2 is a timing chart describing control according to a first embodiment.

FIG. 4 is a timing chart describing control according to a second embodiment.

FIG. 6 is a timing chart describing control according to a third embodiment.

DESCRIPTION OF THE PREFERRED EMBODIMENTS

Figure 1:
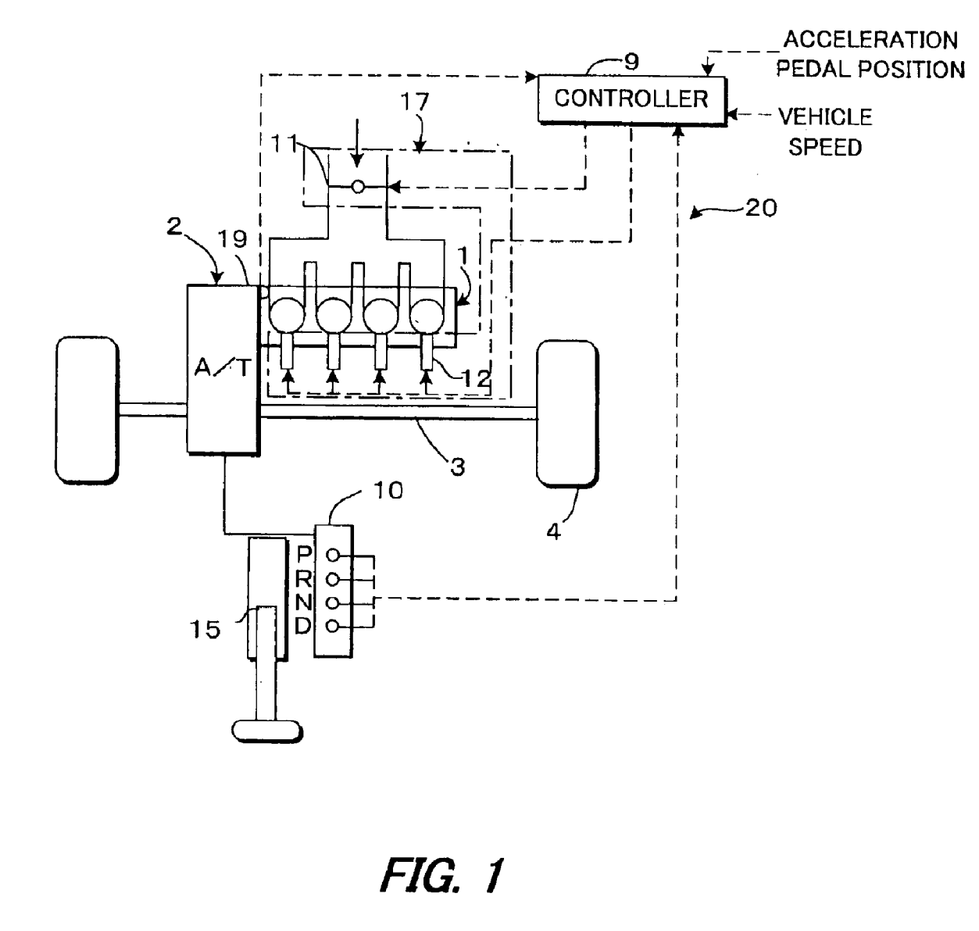
FIG. 1 is a schematic diagram of a vehicle and an engine control device mounted in the vehicle according to this invention.

Referring to FIG. 1 of the drawings, a vehicle adapted for this invention comprises an engine 1, a transmission 2 (automatic transmission 2), a drive shaft 3, vehicle wheels 4, a shift lever 15 and an engine control device 20. The output of the engine 1 is transmitted to the transmission 2. The transmission 2 is an automatic transmission typically comprising a torque converter, a forward/reverse clutch and a variable speed mechanism such as a planetary gear. The operating range of the transmission 2 includes a parking (P) range, a neutral (N) range, a drive (D) range and a reverse (R) range. The driver uses the shift lever 15 in order to select the operating range of the transmission 2. The position of the shift lever 15 has a one-to-one correspondence with the operating range of the transmission 2. When the operating range of the transmission 2 is in a stationary range (parking (P) range or neutral (N) range), both clutches are disengaged. When the operating range is in the drive (D) range, the forward clutch is engaged. When the operating range is in the reverse (R) range, the reverse clutch is engaged. The engagement of the forward or the reverse clutch enables the transmission of torque from the engine 1 to the drive shaft 3. The transmission 2 converts the rotation speed of the engine to a certain rotation speed. The vehicle wheels are driven by the rotation of the drive shaft 3.

The engine control device 20 comprises a controller 9 (electric control unit), an inhibitor switch 10, a torque control mechanism 17 and an engine rotation sensor 19. The torque control mechanism 17 is provided with a fuel injector 12 for injecting fuel or a throttle valve 11 for regulating the intake air amount to the engine, or both. The inhibitor switch 10 is a sensor detecting the shift lever position and outputting a detection signal (range signal) to the controller 9. The controller 9 detects variation in the shift lever position based on a variation in the range signal. The engine rotation speed sensor 19 detects the engine rotation speed.

The controller 9 transmits a command signal to the torque control mechanism 17 in response to the operating state of the vehicle including vehicle speed and acceleration pedal position. In other words, the controller 9 controls either the fuel injection amount of the fuel injector 12 or the opening of the throttle valve 11 or controls both simultaneously. A target engine output torque is achieved as a result of control of the opening of the throttle valve 11 or control of fuel injection by the fuel injector 12, or both.

The controller 9 performing the above control comprises a microcomputer provided with a central processing unit (CPU) for executing programs, a read-only memory (ROM) storing programs or data, a random access memory (RAM) temporarily storing data and calculation results from the CPU and an input/output interface (I/O interface).

Figure 2A:
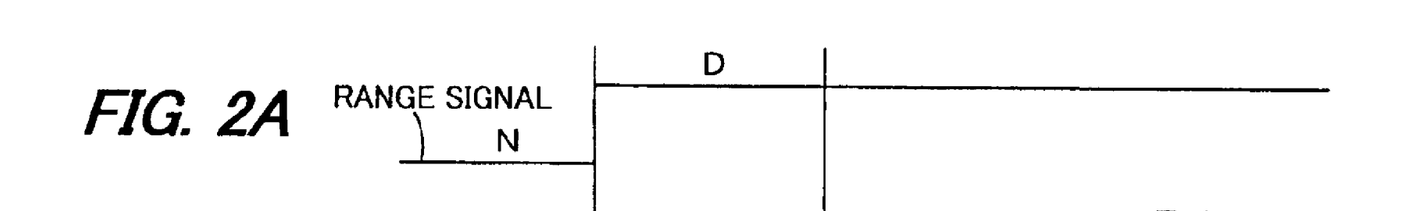
FIG. 2A shows variation in a range signal with respect to time.

Referring to the timing chart in FIG. 2, engine control executed by the controller 9 when the shift lever position shifts from a stationary range position to a running range position will be described. In the description hereafter, N range is taken to be representative of stationary range and D range is taken to be representative of running range. When the vehicle is stationary and the engine 1 is idling, at a time t1, the shift lever position varies from an N range position to a D range position. As a result, a shift starts in transmission operation from the stationary range to the running range. Output torque of the transmission 2 (torque transmitted to the drive shaft 3) starts to increase at a time t2 which is separated from the time t1 by a predetermined interval Tt1 (for example 0.5 seconds). In other words, the speed change of the transmission 2 starts. Herein a predetermined interval Tt1 is the time lag after the variation in the shift lever position until the output torque of the transmission 2 starts to increase. For example, the time lag corresponds to the delay in the oil pressure system for the transmission 2. The output torque of the transmission 2 is zero until the time t2.

The variation in the range of the transmission 2 is completed at a time t3 separated from the time t2 by an interval Tt2 (for example 0.5 seconds). In other words, the shift of the operating range of the transmission 2 from a stationary range to a running range starts at the time t1 and is completed by the time t3. As shown by the broken line in FIG. 2B, when engine output torque does not vary according to the range shift of the transmission to a running range, the output torque of the transmission 2 finally stabilizes at a target torque Tdt0. However after overshooting at approximately t3 and undershooting about the time t5, the output torque of the transmission 2 reaches the stabilized state with a torque Tdt0 at a time t6. Since the torque differential (Tdtmax−Tdtmin) is large immediately after the shift to the running range, the passengers experience a torque shock.

Figure 2B:
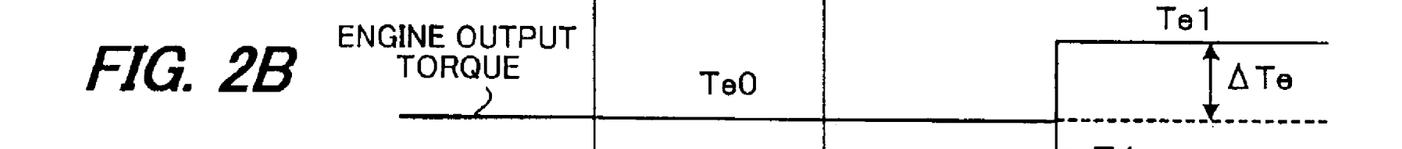
FIG. 2B shows variation in engine output torque with respect to time.
Figure 2C:
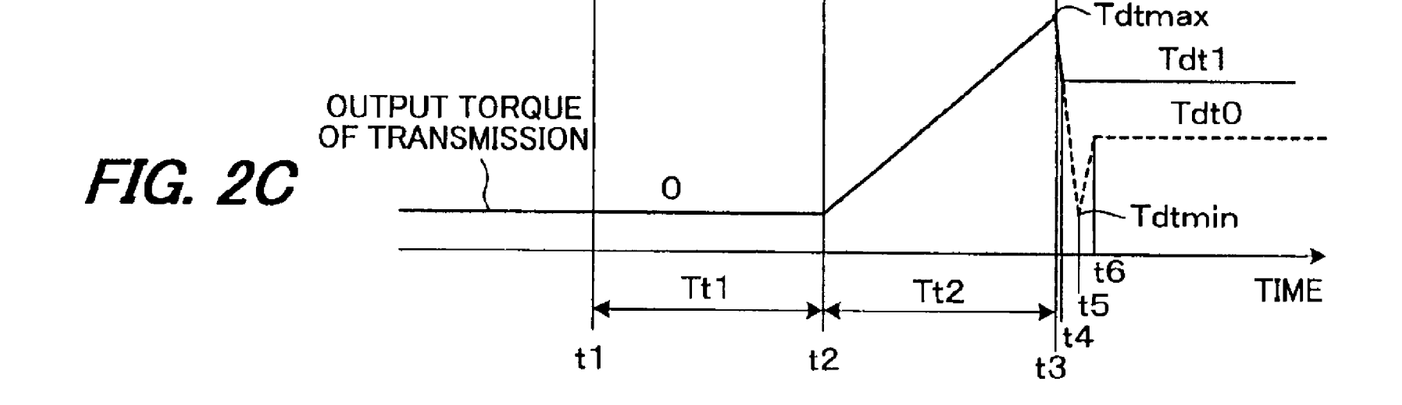
FIG. 2C shows variation in output torque of an automatic transmission with respect to time.

In contrast, in this invention as shown by the solid line in FIG. 2B, the output torque of the engine is corrected to increase from a first output torque Te0 to a second output torque Te1 by a correction gain ΔTe. The first output torque Te0 is the engine output torque when the shift lever position shifts from a stationary range position to a running range position (when the variation (N→D) in the shift lever position is detected). Under normal conditions, the first output torque Te0 is the engine output torque during idling.

The method for realizing this correction gain will be described in detail hereafter. The predetermined correction gain ΔTe for the engine output torque is set based on the engine rotation speed (normally the idling rotation speed) before the variation (N→D) in the shift lever position is detected. Thus, the correction gain ΔTe increases as the engine rotation speed before the variation (N→D) in the shift lever position increases. The engine load increases as a result of load on auxiliary devices in the operation of auxiliary devices such as the alternator or the air conditioner. In this case, the engine power and thus the engine rotation speed are usually increased by an idle-up device which operates to increase the opening of the throttle valve 11 when an auxiliary device is operating. Consequently the correction gain ΔTe for the engine output torque is set in response to the auxiliary device load. In other words, the correction gain ΔTe is set to increase as the number of operated auxiliary devices increases. In this manner, as shown by the solid line in FIG. 2C, although the output torque of the transmission 2 overshoots near to the time t3, the output torque of the transmission 2 coincides with a steady-state value (a target torque) Tdt1 at the time t4 without falling under the steady-state value Tdt1 after the time t3. This is achieved by the increment ΔTe in the engine output torque.

After the variation in the shift lever position is detected, the correction on the engine output torque is executed after a time period (Tt1+Tt2) elapses. Thus it is possible to decrease the torque differential by suppressing the undershoot. A decrease in the torque differential suppresses shocks felt by passengers immediately after the shift in the operating range of the transmission 2 from a stationary range to a running range.

The torque differential increases when the load related to operation of auxiliary devices increases. However since the correction gain ΔTe for engine output torque is set in response to the load related to operation of auxiliary devices, it is possible to ensure suppression of a torque differential related to variation in the auxiliary device load.

Referring to the flowchart in FIG. 3, a control routine related to the control shown in FIG. 2 will be described. This control routine is embodied in a program executed by the controller 9 and is executed in a repeated manner.

Firstly in a step S1 and a step S2, it is determined whether or not the shift lever position has varied from a stationary range position to a running range position. In the step S1, it is determined whether or not the current shift lever position is in the P range position or the N range position. When the shift lever position is outside the P range position and the N range position, the control routine is terminated. When the shift lever position is in the P or N range in the step S1, the routine proceeds to the step S2 where it is determined whether or not the shift lever position is outside of the P and N range position. When a range position outside of the P and N range is detected, it is determined that the shift lever position has shifted to a running range position and the routine proceeds to a step S3. In the step S2, when a P or N range position is detected, the control routine is terminated.

The predetermined correction gain ΔTe for engine output torque is set based on the engine rotation speed before the variation (N→D) in the shift lever position is detected. In this case, an optional step S1' may be provided between the step S1 and the step S2. Otherwise, the correction gain ΔTe may be set before the routine starts. In the step S1', the controller 9 uses the engine rotation speed sensor 19 to detect the engine rotation speed and sets the correction gain ΔTe based on the detected engine rotation speed.

In a step S3, the time is counted up and it is determined whether or not the elapsed time after the detection of the shift in the shift lever position in the step S2 is greater than a first predetermined period TtB1. When the determination is negative, the determination in the step S3 is repeated. Thus after the step S2, the routine waits until the first predetermined period TtB1 elapses. When the determination is affirmative, the routine proceeds to a step S4. In a step S4, a correction increasing the engine output torque is performed by transmitting a command signal to the torque control mechanism 17 i.e. throttle valve 11 or fuel injector 12. The routine is terminated after the step S4. Therefore the first predetermined period TtB1 basically represents the time period (Tt1+Tt2) between the shift in the shift lever position from a stationary range position to a running range position and the completion of the actual shift to a running range (D or R) of the automatic transmission 2. The completion of the actual shift to a running range means the completion of engagement of the forward/reverse clutch.

When the controller 9 sets a target air fuel ratio, the engine output torque is determined on the basis of the intake air amount aspirated into the cylinders. The control of the intake air amount is performed by regulating the opening of the throttle valve 11 by the controller 9. The controller 9 sets the target air fuel ratio, (intake air amount)/(fuel injection amount), in response to the exhaust emission control requirements. The fuel injection amount is determined based on the intake air amount required to realize the target air fuel ratio and varies in response to the intake air amount. Thus the fuel injection amount increases when the intake air amount increases. In this manner, engine output torque increases from the first output torque Te0 (for example 20 Nm) to the second output torque Te1 by a correction gain ΔTe (for example 5 Nm).

Conversely when the target air fuel ratio is not set, the controller 9 can perform independent control of the fuel injector 12 and the throttle valve 11. The controller 9 transmits a command signal to at least one of the throttle valve 11 and the fuel injector 12 in order to increase the engine output torque.

Since the intake air amount is realized by the throttle valve 11, a time lag (transmission time lag) occurs due to the time taken for an amount of intake air to enter the cylinders. This time lag depends on the capacity of the air passage from the throttle valve to the cylinders. Consequently variation in the engine output torque occurs later than variation in the throttle valve opening. Thus the first predetermined period TtB1 used in the determination in the step S3 may take the transmission time lag of the intake air amount into account and may be set to a time corresponding to the transmission time lag being subtracted from the time period (Tt1+Tt2).

Figure 4A:
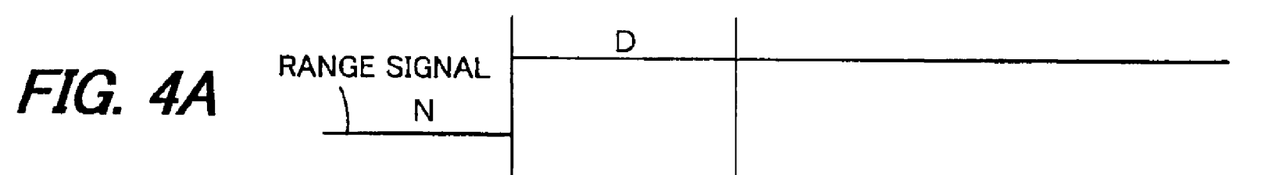
FIG. 4A shows variation in a range signal with respect to time.

Referring to the timing chart in FIG. 4, a second embodiment for engine control executed by the controller 9 will be described. The control up to the time t3 corresponds to that in the first embodiment shown in FIG. 2.

After the time t3 in the first embodiment, the engine output torque is maintained at a second output torque Te1 which increases from a first output torque Te0 by the predetermined correction gain ΔTe. The second embodiment differs from the first embodiment in that the engine output torque returns to the first output torque Te0 from the time t7 to the time t8.

Figure 4B:
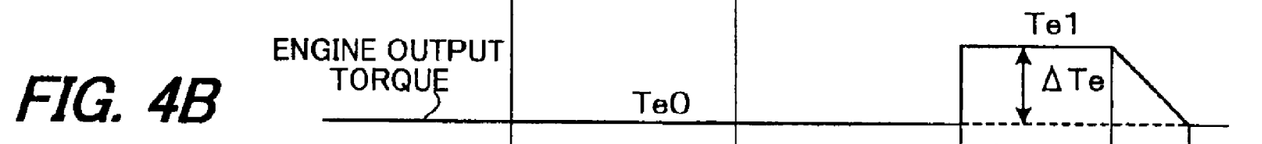
FIG. 4B shows variation in engine output torque with respect to time.
Figure 4C:
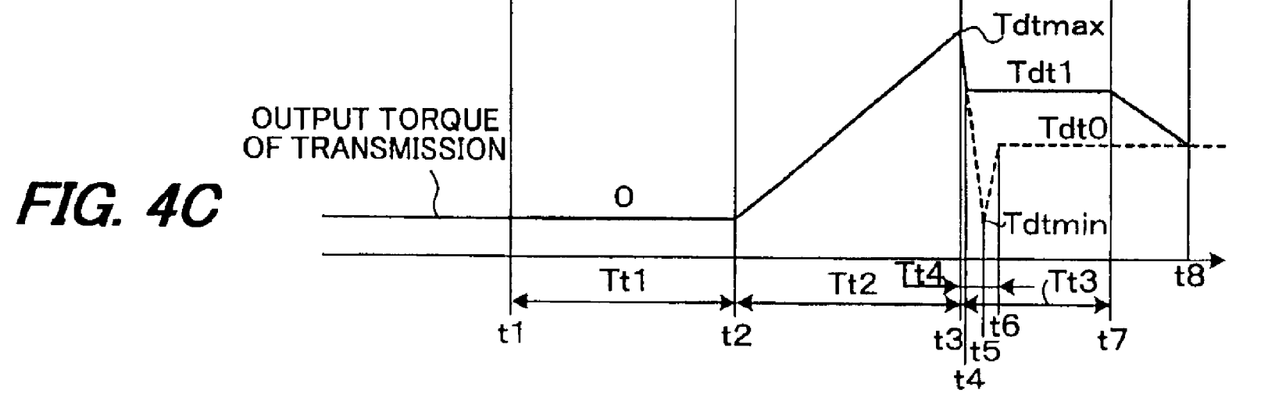
FIG. 4C shows variation in output torque of an automatic transmission with respect to time.

As shown in FIG. 4B, after the engine output torque has increased from the first output torque Te0 to the second output torque Te1 as a result of the correction gain ΔTe at the time t3, engine output torque is maintained at the second output torque Te1 during the time period Tt3 (for example 0.4 seconds) from the time t3 to the time t7. The engine output torque gradually decreases from the second output torque Te1 after the time t7 and engine output torque returns to the first output torque Te0 at the time t8.

The time period Tt3 is longer than the time period Tt4. The time period Tt4 (for example 0.1 seconds) is defined by the period from the time t3 at which the transmission 2 completely shifts to a running range to the time t6 at which the output torque of the transmission stabilizes if it is assumed that engine output torque is constant (in other words, if a correction gain is not applied as a result of a shift in the operating range of the transmission 2) (refer to FIGS. 4B and 4C).

In this manner, it is possible to ensure suppression of a torque differential that would be produced if engine output torque were constant. Furthermore it is possible to limit any increase in the fuel injection amount which increases the engine output torque to the minimum amount required for suppressing the torque differential.

Referring to the flowchart in FIG. 5, a control routine according to the second embodiment will be described. This control routine is embodied in a program executed by the controller 9 and is executed in a repeated manner.

Figure 3:
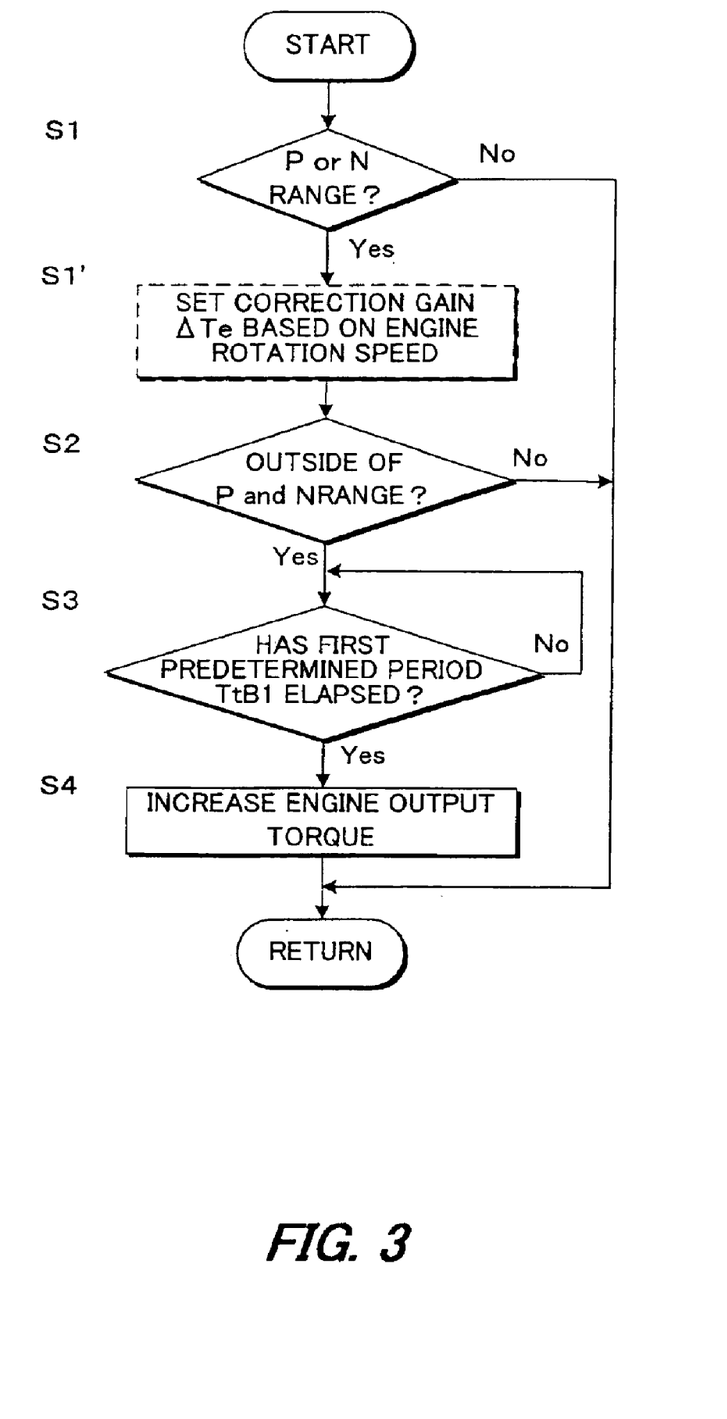
FIG. 3 is a flowchart of control according to a first embodiment.
Figure 5:
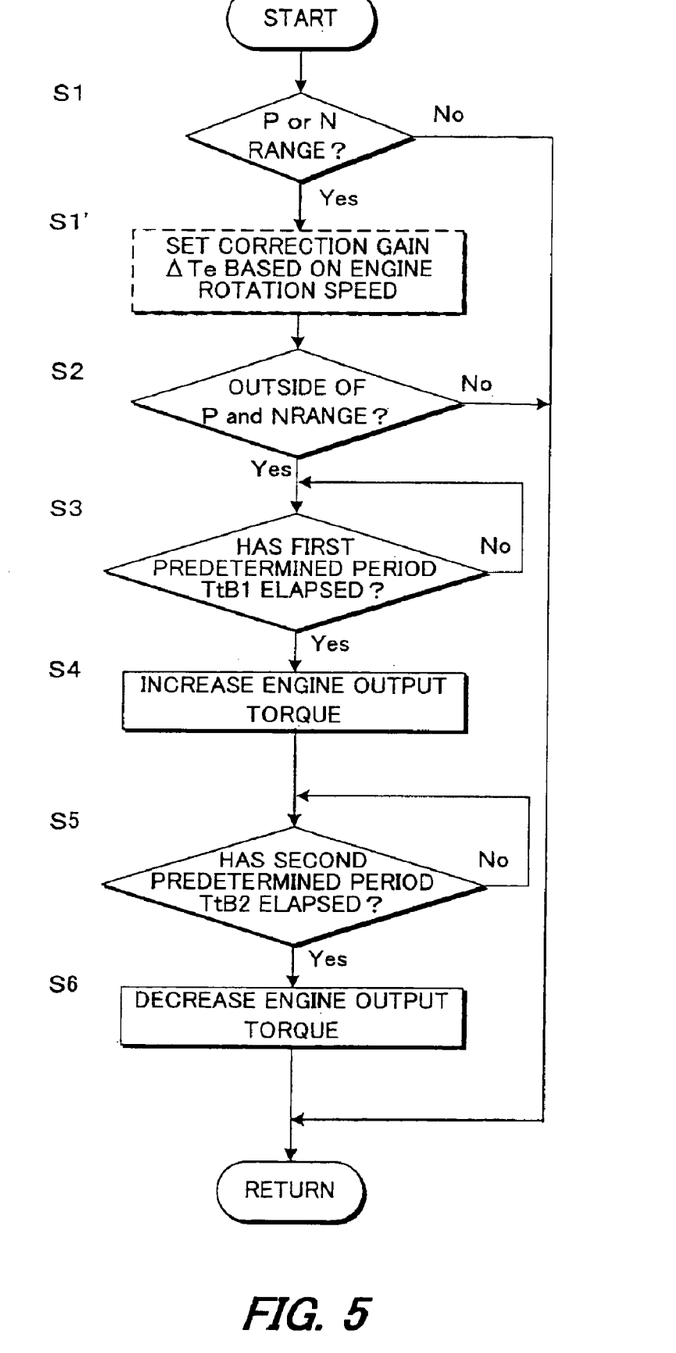
FIG. 5 is a flowchart showing control according to the second embodiment.

Since the control routine in the steps S1 to S4 in FIG. 5 corresponds to the control in the steps S1 to S4 in FIG. 3, additional description will be omitted for these steps.

In the step S5, it is determined whether or not the elapsed time after the time t3 is greater than the second predetermined period TtB2. In other words, it is determined whether or not the second predetermined period TtB2 has elapsed after the correction gain is applied to the engine output torque in the step S4. When the determination is negative, the determination in the step S5 is repeated. Therefore after the step S4, the routine waits until the second predetermined period TtB2 elapses. When the determination is positive, the routine proceeds to the step S6. In the step S6, a command signal is outputted to the torque control mechanism 17 in order to gradually reduce the engine output torque from the second output torque Te1. As a result, the engine output torque returns to the first output torque Te0. After the step S6, the routine is terminated. Herein the second predetermined period TtB2 basically represents the time period Tt3, however it may take into account the time lag of the transmission of the intake air from the throttle valve 11 to the cylinders and may be set to a period corresponding to the transmission time lag being subtracted from the time period Tt3. However the time period Tt3 is still longer than the time period Tt4.

Referring to the timing chart in FIG. 6, a third embodiment will be described.

Figure 6A:
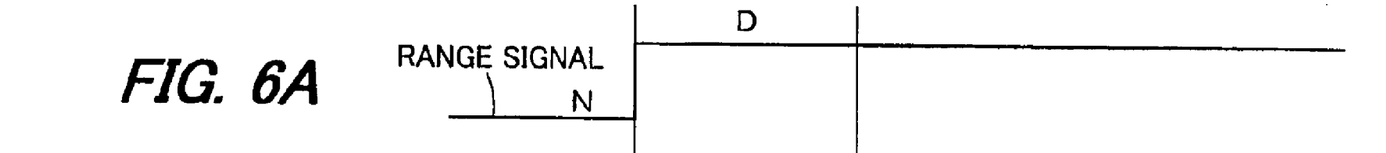
FIG. 6A shows variation in a range signal with respect to time.
Figure 6B:
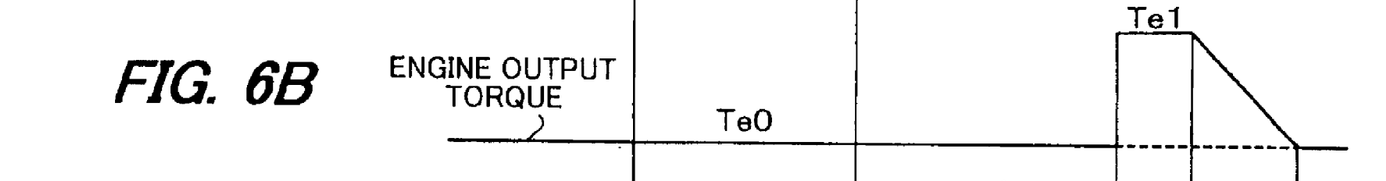
FIG. 6B shows variation in engine output torque with respect to time.
Figure 6C:
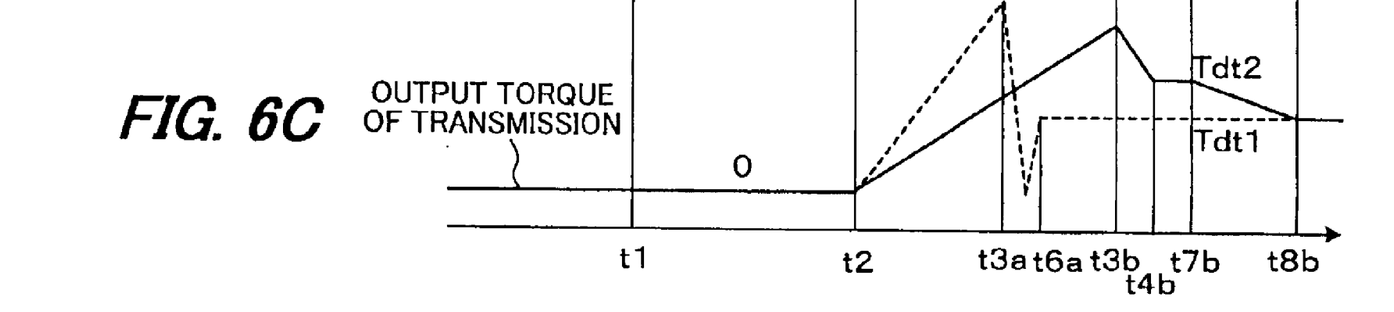
FIG. 6C shows variation in output torque of an automatic transmission with respect to time.

Firstly a prior-art example of control will be described as shown by the broken line in FIGS. 6A to 6C. At a time t1, the shift lever position is varied. At a time t2, the output torque of the transmission 2 starts to increase. The output torque of the transmission 2 continues to increase until a time t3a. Thereafter after the shortfall in output torque, the output torque of the transmission 2 converges to the predetermined torque Tdt1 at a time t6a.

In contrast, in the third embodiment, at the time t2, the output torque of the transmission 2 starts to increase. However the rate of increase is smaller than in the prior-art technique. The suppression of the rate of increase in the torque is due to providing an orifice in the oil supply line of the transmission 2. The provision of the orifice also suppresses the overshoot and shortfall of the output torque of the transmission 2.

The increase in torque continues until the time t3b. The engine output torque increases from Te0 to Te1 at the time t3b, is gradually reduced after the time t7b and coincides with Te0 at the time t8b.

The control routine of the third embodiment is the same as the control routine described in FIG. 5 with reference to the second embodiment and only differs with respect to the setting of the predetermined time during the control routine. In other words, the first predetermined time is the time from the time t1 to the time t3b and the second predetermined time is the time from the time t3b to the time t7b.

The entire contents of Japanese Patent Application P2003-1376 (filed Jan. 7, 2003) are incorporated herein by reference.

Although the invention has been described above by reference to certain embodiments of the invention, the invention is not limited to the embodiments described above. Modifications and variations of the embodiment described above will occur to those skilled in the art, in light of the above teachings. The scope of the invention is defined with reference to the following claims.

What is claimed is:

1. An engine control device for a vehicle, the vehicle having an engine, an automatic transmission receiving an output torque of the engine, a drive shaft for transmitting an output torque from the automatic transmission to the vehicle wheels and a shift lever for selecting the operating range of the automatic transmission; wherein the operating range of the automatic transmission includes a stationary range in which the engine output torque is not transmitted to a side of the drive shaft and a running range in which the engine output torque is transmitted to the side of the drive shaft, and a shift lever position includes a stationary range position corresponding to the stationary range of the automatic transmission and a running range position corresponding to the running range of the automatic transmission; the engine control device comprising:

a torque control mechanism for regulating the engine output torque, the torque control mechanism including at least one of a fuel injector for injecting fuel and a throttle valve for regulating an intake air amount to the engine;

a sensor for detecting the shift lever position;

and a controller comprising a microcomputer; the controller being programmed to:

detect a shift in the shift lever position from the stationary range position to the running range position based on the shift lever position; and transmit a first command signal to the torque control mechanism when a first predetermined period elapses after the detection of the shift in the shift lever position, the command signal increasing the engine output torque by a predetermined correction gain from a first output torque at the detection of the shift lever position to a second output torque.

2. The engine control device as defined in claim 1, wherein the controller is further programmed to wait until a second predetermined period elapses after the transmission of the first signal and then transmit a second command signal for decreasing the engine output torque to the first output torque to the torque control mechanism.

3. The engine control device as defined in claim 1, wherein the first predetermined period is a period after the shift in the shift lever position until the completion of the shift to the running range of the automatic transmission.

4. The engine control device as defined in claim 1, wherein a second predetermined period is greater than a period from the shift to a running range of the automatic transmission until the output torque of the automatic transmission stabilizes if it is assumed that the engine output torque has not increased to the second output torque.

5. The engine control device as defined in claim 1, wherein the predetermined correction gain for the engine output torque increases with an increase in an engine rotation speed before the shift in the shift lever position from the stationary range position to the running range position.

6. The engine control device as defined in claim 1, wherein the controller is further programmed to set the predetermined correction gain in response to auxiliary device load of operated auxiliary devices.

7. The engine control device as defined in claim 1, wherein the first output torque is an output torque of the engine during idling.

8. An engine control device for a vehicle, the vehicle having an engine, an automatic transmission receiving an output torque of the engine, a drive shaft for transmitting an output torque from the automatic transmission to the vehicle wheels and a shift lever for selecting the operating range of the automatic transmission; wherein the operating range of the automatic transmission includes a stationary range in which the engine output torque is not transmitted to a side of the drive shaft and a running range in which the engine output torque is transmitted to the side of the drive shaft, and a shift lever position includes a stationary range position corresponding to the stationary range of the automatic transmission and a running range position corresponding to the running range of the automatic transmission; the engine control device comprising:

means for regulating the engine output torque;

means for detecting the shift lever position;

means for detecting a shift in the shift lever position from the stationary range position to the running range position based on the shift lever position; and means for transmitting a command signal to the torque control mechanism when a first predetermined period elapses after the detection of the shift in the shift lever position, the command signal increasing the engine output torque by a predetermined correction gain from a first output torque at the detection of the shift lever position to a second output torque.

9. An engine control method for a vehicle, the vehicle having an engine, an automatic transmission receiving an output torque of the engine, a drive shaft for transmitting an output torque from the automatic transmission to the vehicle wheels and a shift lever for selecting the operating range of the automatic transmission; wherein the operating range of the automatic transmission includes a stationary range in which the engine output torque is not transmitted to a side of the drive shaft and a running range in which the engine output torque is transmitted to the side of the drive shaft, and a shift lever position includes a stationary range position corresponding to the stationary range of the automatic transmission and a running range position corresponding to the running range of the automatic transmission; the engine control method comprising:

detecting the shift lever position;

detecting a shift in the shift lever position from the stationary range position to the running range position based on the shift lever position; and transmitting a command signal to a torque control mechanism when a first predetermined period elapses after the detection of the shift in the shift lever position, the command signal increasing the engine output torque by a predetermined correction gain from a first output torque at the detection of the shift lever position to a second output torque, wherein the torque control mechanism includes at least one of a fuel injector for injecting fuel and a throttle valve for regulating an intake air amount to the engine.

\* \* \* \* \*